United States Patent [19]
Wikman et al.

[11] 3,903,183
[45] Sept. 2, 1975

[54] PRODUCTION OF CHLORINATED HYDROCARBONS

[75] Inventors: Andrew O. Wikman; Louis B. Reynolds, Jr., both of Baton Rouge, La.

[73] Assignee: Ethyl Corporation, Richmond, Va.

[22] Filed: Feb. 20, 1973

[21] Appl. No.: 334,069

Related U.S. Application Data

[63] Continuation-in-part of Ser. No. 63,647, Aug. 13, 1970, abandoned, which is a continuation of Ser. No. 716,667, March 27, 1968, abandoned, which is a continuation of Ser. No. 384,435, July 22, 1964, abandoned.

[52] U.S. Cl. ........................... 260/658 R; 260/652 P
[51] Int. Cl. ............................................. C07c 17/00
[58] Field of Search ................................ 260/658 R

[56] References Cited
UNITED STATES PATENTS

| | | | |
|---|---|---|---|
| 3,012,080 | 12/1961 | Bergeron...................... | 260/658 R |
| 3,012,081 | 12/1961 | Conrad et al. ................ | 260/658 R |
| 3,059,035 | 10/1962 | Benner et al................. | 260/658 R |
| 3,304,337 | 2/1967 | Jordan et al. ................ | 260/658 R |

FOREIGN PATENTS OR APPLICATIONS 1,106,533   3/1968   United Kingdom............. 260/658 R Primary Examiner—Delbert E. Gantz
Assistant Examiner—Joseph A. Boska
Attorney, Agent, or Firm—Donald L. Johnson; John F. Sieberth; Edgar E. Spielman, Jr.

[57] ABSTRACT

An integrated process for producing substantially pure 1,1,1-trichloroethane whereby (1) a hydrochlorination product stream and a chlorination product stream are produced separately but concurrently, the hydrochlorination product stream being produced by the reaction of vinyl chloride and hydrogen chloride and the chlorination product stream being produced by the reaction of chlorine and 1,1-dichloroethane and (2) the concurrent distilling in a distillation zone of the hydrochlorination product stream and the chlorination product stream to yield substantially pure 1,1,1-trichloroethane, 1,1-dichloroethane used as feed to the chlorination process, hydrogen chloride used as feed to the hydrochlorination process, and heavy ends containing essentially all undesirable by-products, all without exposing the produced 1,1,1-trichloroethane to the hydrochlorination process.

13 Claims, 1 Drawing Figure

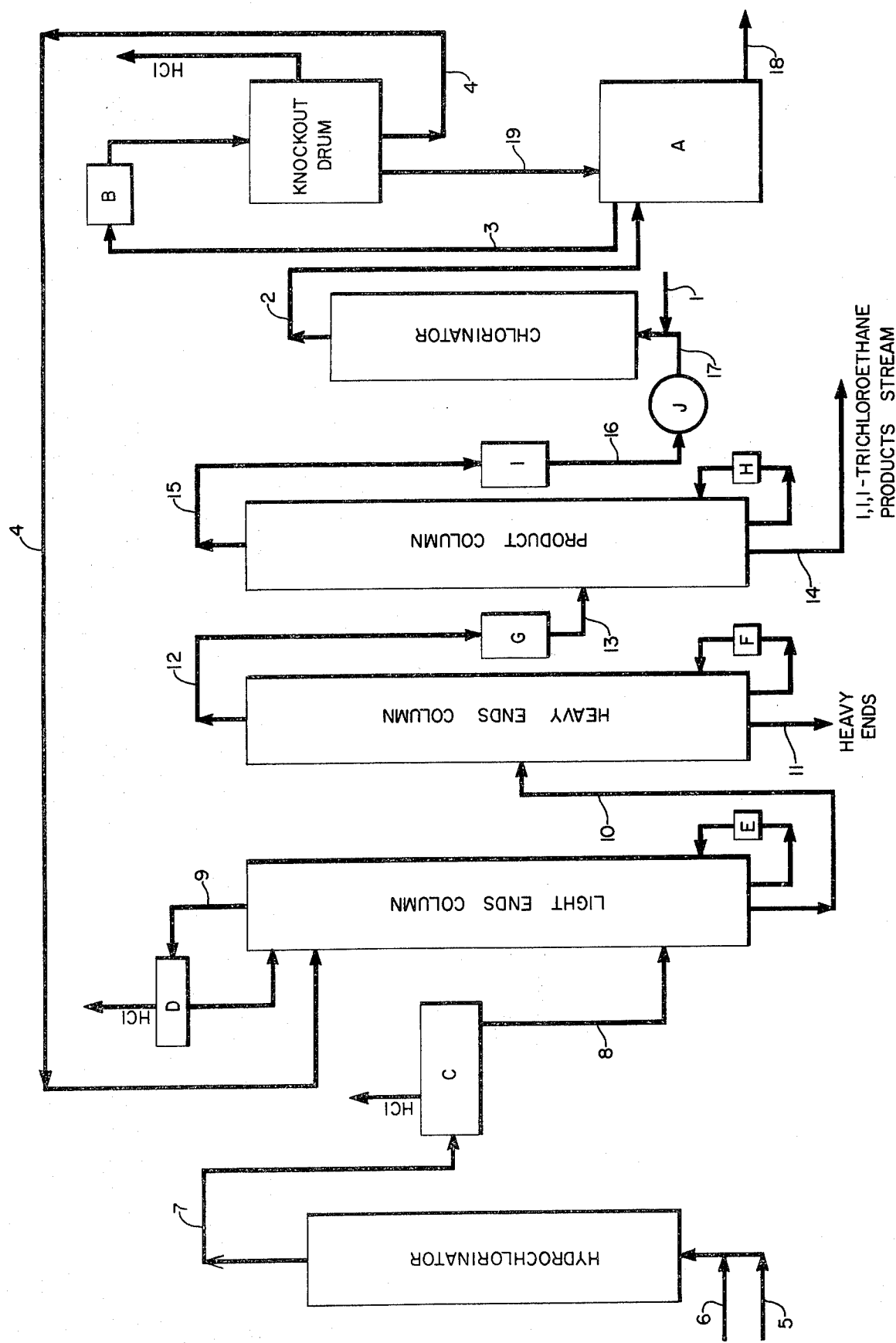

PRODUCTION OF CHLORINATED HYDROCARBONS

CROSS-REFERENCE TO RELATED APPLICATIONS

This is a continuation-in-part of co-pending application Ser. No. 63,647 filed Aug. 13, 1970, now abandoned which in turn is a continuation of now abandoned application Ser. No. 716,667 which was filed Mar. 27, 1968, which in turn was a continuation of now abandoned application Ser. No. 384,435 filed July 22, 1964.

BACKGROUND OF THE INVENTION

Various processes are known for the manufacture of 1,1,1-trichloroethane (methyl chloroform) though such processes generally possess serious disadvantages. Such disadvantages include low yields of 1,1,1-trichloroethane, low conversion of raw materials to 1,1,1-trichloroethane, high catalyst consumption, high carbonization of reagents, complex equipment, multistage reactors and the like. One specific problem of great seriousness often encountered is the contamination of the 1,1,1-trichloroethane with relatively large amounts of materials such as 1,2-dichloroethane which are very difficult to remove due to the similarities in volatility. Another serious problem encountered is the contamination of the product with catalytic material. Such impurities should be removed or minimized in the process because they result in a poor quality of methyl chloroform.

In an effort to solve these problems the industry has often resorted to complicated and expensive extraction procedures to separate the 1,1,1-trichloroethane from other halogenated hydrocarbon contaminants. Also the art often utilizes a complex process arrangement involving many different stages, steps or unit operations in order to obtain a pure product.

A object of the present invention is therefore to provide a process for the production of 1,1,1-trichloroethane which avoids the foregoing and many other defects and which possesses outstanding advantages. More particularly, it is an object to provide an efficient process for the production of 1,1,1-trichloroethane which does not favor the formation of large quantities and varieties of by-products. Another object of this invention is to provide a continuous process for the production of 1,1,1-trichloroethane which is capable of long periods of operation without the necessity of shutting down for cleanout or other maintenance. Further, it is an object of this invention to provide a process which produces substantially pure methyl chloroform and which is simpler in its arrangement than other processes heretofore known.

DESCRIPTION OF THE DRAWING

The drawing is a schematic diagram illustrating an embodiment of this invention.

THE INVENTION

This invention relates to an integrated process for producing substantially pure 1,1,1-trichloroethane which comprises the concurrent formation of a hydrochlorination product stream and a chlorination product stream, the hydrochlorination product stream being produced by the reaction of vinyl chloride and hydrogen chloride and the chlorination product stream being produced by the reaction of chlorine and 1,1-dichloroethane, and the concurrent distilling in a distillation zone of a liquid portion of the hydrochlorination product stream and a liquid portion of the chlorination product stream to yield substantially pure 1,1,1-trichloroethane (the product), 1,1-dichloroethane (for feed to the chlorination process), hydrogen chloride (for feed to the hydrochlorination process) and heavy ends (by-products). More particularly the process of this invention comprises introducing a 1,1-dichloroethane feed stream into a chlorination zone, preferably an adiabatic chlorination zone, so as to effect at least partial thermal chlorination thereof to produce a first product stream of 1,1,1-trichloroethane, 1,1-dichloroethane, hydrogen chloride and associated by-products; cooling the first product stream to yield a liquid portion of the first stream; concurrently hydrochlorinating vinyl chloride in a separate hydrochlorination reaction zone so as to produce a second product or intermediate product stream of 1,1-dichloroethane and associated by-products and thereupon condensing at least a portion of the second product stream; introducing at least a portion of the liquid portion of the first product stream and at least a portion of the liquid portion of the second product stream into a light ends distillation column and withdrawing an enriched 1,1-dichloroethane and 1,1,1-trichloroethane stream as the bottoms of said light ends distillation column; introducing at least a portion of said bottoms into a heavy ends distillation column and withdrawing therefrom an essentially pure 1,1-dichloroethane and 1,1,1-trichloroethane distillate; introducing at least a portion of said distillate into a products distillation column, thereby effecting separation between 1,1-dichloroethane and 1,1,1-trichloroethane, at least a portion of the 1,1-dichloroethane being utilized as said 1,1-dichloroethane feed stream to the chlorination zone; and recovering 1,1,1-trichloroethane from the products column.

The process of this invention offers many advantages due to the unique integration of the various process steps as described above. For example, the 1,1,1-trichloroethane product produced in the chlorinator is not exposed to the hydrochlorination process thus reducing, indeed eliminating in some instances, the production of undesirable by-products such as vinylidene chloride and polymer. Without this feature of the present invention a portion of the trichloroethane would, in the presence of the catalyst and under the operating conditions in the hydrochlorinator, be cracked yielding these undesirable by-products. Another advantage of the process of this invention is that the only feeds required after start-up are chlorine and vinyl chloride — 1,1-dichloroethane feed to the chlorinator and hydrogen chloride feed to the hydrochlorinator are generated in the process itself. Still another advantage is that contamination of the product with catalytic material is minimized.

For a more thorough understanding of the present invention, reference is made to the accompanying drawing, which is a diagrammatic illustration of a system which may be suitably employed to conduct the process as herein described. As shown in the drawing elemental chlorine is fed into the chlorination reaction zone via line 1 together with a stream of preheated and vaporized 1,1-dichloroethane which is introduced through line 17. The 1,1-dichloroethane is heated to a sufficient temperature so that when reacting with the chlorine a stabilized reaction results. In other words, this preheating provides a reaction in which the reaction system is thermodynamically balanced such that it is unnecessary to supply additional heating and even to remove excess heat from the reaction zone. It is generally necessary to preheat the 1,1-dichloroethane feed to a temperature of from about 100°F to about 500°F. A more preferred preheating temperature is from about 300°F to about 450°F because under these conditions by-product formation is minimized and high yields are achieved. The feed to the chlorination zone is adjusted so that a molar ratio of chlorine:1,1-dichloroethane is provided and maintained within from about 0.2:1 to about 0.7:1 and preferably within from about 0.3:1 to about 0.35:1. The chlorine:1,1-dichloroethane ratio which will provide a stable reaction temperature is closely related to the temperature imposed upon the 1,1-dichloroethane feed, the chlorine feed being at ambient temperatures. Thus, the quantity of heat given off by the exothermic substitution chlorination reaction plus the heat provided to the 1,1-dichloroethane feed is sufficient to provide a stabilized reaction within the zone. The chlorination reaction is within a fluid bed medium and is stabilized at a temperature uniform throughout the fluidized bed of from about 600°F to about 800°F and preferably at a temperature of from about 650°F to about 750°F. The reaction can be conducted from about atmospheric pressure up to about 200 pounds per square inch gauge and preferably up to 70 pounds per square inch gauge. An excellent operating pressure is from about 40 to about 60 pounds per square inch gauge wherewith additional pressure is not required to transfer the stream back to the hydrochlorinator.

While the chlorination is most preferably an adiabatic chlorination as described above, the process of this invention may be conducted to advantage under non-adiabatic conditions, i.e., heat may be added to or removed from the reactor bed. The fluidized bed in this chlorination zone is preferably composed of fine sand into which the gasses are passed and reacted. For best results the sands should be substantially free of nickel and iron and their compounds. The gasses are introduced into the bed at such velocity that good fluidization occurs and also good heat transfer from the reaction gasses to the sand. The only limitation regarding the velocity of the entering gasses is that the velocities be compatible with the type of sand employed and the reactor design used. To provide the proper fluidities for fine sand it is generally preferable that the superficial velocity of the gasses entering the reaction zone be maintained at from about 0.1 to about 2.0 feet per second. Where cyclone separators are provided to collect and return the sand, gas velocities greater than 2 feet per second can be used. It is generally more preferable however that the velocity be maintained within the range of from about 0.5 to about 1.5 feet per second.

The product mixture from the chlorination zone is passed through line 2 into vessel A and a portion of heat is removed from the stream. This product stream contains substantially 1,1,1-trichloroethane and unreacted 1,1-dichloroethane and associated by-products, primarily hydrogen chloride and lesser portions of by-product components. Vessel A may be referred to as the thermal chlorinator quench drum or vessel and is preferably an unpacked vessel, but may if desired, be packed with some suitable material of high surface area such as Raschig rings. At least a portion of any condensed higher boiling by-products in the thermal chlorinator product stream is removed from the vessel by means of line 18. The gaseous quench stream from vessel A is passed via line 3 to condenser B and at least partially condensed. Condenser B is conveniently referred to as the thermal chlorinator condenser. The partially condensed stream from condenser B is passed into a knock-out drum or vessel from which hydrogen chloride produced in the chlorinator is removed. This gaseous hydrogen chloride is preferably utilized to at least partially fulfill the hydrogen chloride requirements of the hydrochlorinator. The remaining partially condensed stream, i.e., the liquid in the knock-out drum, is transferred or recycled from the knock-out drum to the light ends column via line 4. A portion of the liquid in the knock-out vessel preferably is transferred to vessel A via line 19 to provide the quench liquid. That portion of the quench liquid which is vaporized will be sent to condenser B via line 3 along with the gaseous quench stream. It can be seen from the foregoing that the operative essence of the chlorinator product stream treatment train, i.e., line 2, quench vessel A, line 3, condenser B, the knock-out drum and line 4 is to cool and separate the thermal chlorinator product stream into principally a hydrogen chloride portion and a liquid portion, the latter being hereinafter referred to as the chlorinator product liquid. The chlorinator product liquid is primarily composed of 1,1-dichloroethane, 1,1,1-trichloroethane and minor amounts of hydrogen chloride and other by-products.

Referring now to the hydrochlorinator which is a reaction vessel adapted to handling corrosive materials such as hydrogen chloride. This vessel is preferably constructed of steel or similar material and may be lined with glass or polytetrafluoroethylene. Vinyl chloride is fed into the lower portion of the hydrochlorinator via line 5. The vinyl chloride may be fed at ambient temperatures or may be preheated up to about 100°F. Substantially gaseous hydrogen chloride is fed into the hydrochlorinator via line 6. The hydrogen chloride may be fed separately into the hydrochlorinator but is preferably premixed with the vinyl chloride as shown in the drawing. Preferably this hydrogen chloride is at least partially provided by the hydrogen chloride produced in the chlorination zone. In a preferred embodiment substantially all of the hydrogen chloride requirements are provided by the hydrogen chloride generated within the system itself. In order to have good conversion of vinyl chloride a molar excess of hydrogen chloride should be utilized. In mole percent this excess may range up to 150 and preferably from about 50 to about 100 percent excess. A Friedel-Crafts catalyst such as aluminum chloride or iron chloride is charged into the hydrochlorinator prior to start-up. Preferably iron chloride is employed. The reaction temperature within the hydrochlorinator ranges from about 100°F to about 200°F and preferably from about 135°F to about 150°F. The pressure within the hydrochlorination zone is generally superatmospheric with pressures of up to about 100 psig being not uncommon. Ambient pressure may also be utilized. A preferred pressure range is from about 5 to about 20 psig. The contents of the hydrochlorinator are in the form of a boiling mixture composed of the reagents, the catalyst, the products and associated by-products produced therein. The hydrochlorinator products stream is withdrawn as a vapor from the hydrochlorinator via line 7 and fed to condensation zone C. The hydrochlorinator product stream is composed of 1,1-dichloroethane, unreacted vinyl chloride and hydrogen chloride and small amounts of associated by-products such as 1,1,2-trichloroethane and the like. This condensation zone may be a single or multistage arrangement of condensers wherein the hydrochlorinator product stream is at least partially condensed and wherein hydrogen chloride vapors are withdrawn and preferably recycled to the hydrochlorinator. The liquid portion of the hydrochlorinator product stream is withdrawn from the condensation zone C via line 8 and fed into the light ends column.

As noted above, the chlorinator product liquid and the liquid portion of the hydrochlorinator product stream are fed into the light ends column, the former via line 4 and the latter via line 8. The point of addition for these streams to the light ends column is not critical. For example, the chlorinator product liquid can be fed to the upper portion of the light ends column with the liquid portion of the hydrochlorinator product stream being fed to the bottom portion of the column as is shown in the Drawing. Another type of addition is shown in the Example wherein both the chlorinator product liquid and the liquid portion of the hydrochlorinator product stream are fed together into the bottom portion of the column. A preferred point of addition for the chlorinator product liquid is the upper portion of the column as shown in the Drawing.

The light ends column is a distillation type column fitted with a reboiler E, an overhead condenser D, and distillation trays or the equivalent of distillation trays such as packing. The light ends are withdrawn from the light ends column via line 9. This stream is conveniently referred to as the light ends column overhead and is composed primarily of hydrogen chloride, vinyl chloride, 1,1-dichloroethane and lesser amounts of other compounds. The hydrogen chloride of the light ends column overhead is preferably recycled back to the hydrochlorinator and the liquids returned to the column. The bottoms from the light ends column are withdrawn therefrom and fed into the heavy ends column via line 10. This stream is conveniently referred to as the heavy ends column feed and is composed primarily of 1,1,1-trichloroethane, 1,1-dichloroethane and small amounts of other by-products. The heavy ends column is a distillation type column fitted with a reboiler F, a condenser G, and distillation trays, or the equivalent of distillation trays. The heavy ends of the heavy ends column are withdrawn therefrom via line 11. The composition of these heavy ends is primarily 1,1,2-trichloroethane and lesser amounts of other by-products. This stream is disposed of or used in other plant facilities. The overhead stream from the heavy ends column is withdrawn through line 12 and at least partially condensed in condenser G and fed via line 13 to the product column. The heavy ends overhead product stream (the product column feed) as fed to the product column is composed of primarily 1,1-dichloroethane and 1,1,1-trichloroethane. The product column is a distillation type column fitted with a reboiler H, an overhead condenser I, and fitted with distillation trays or their equivalent such as packing, etc. The bottoms stream from the product column 14, is the product stream and is essentially pure 1,1,1-trichloroethane. This stream is cooled and transferred to a product storage area for stabilization, storage and processing for market. The overhead from the product column is withdrawn via line 15 and condensed or at least partially condensed in condenser I and transferred via line 16 to the preheater J, and is passed from the preheater to the thermal chlorinator via line 17. This product column overhead stream is composed primarily of 1,1-dichloroethane and minor amounts of other chlorinated hydrocarbons.

In the various condensers described above or otherwise employed in the process of this invention there generally are materials difficult as a practical matter to condense. These remaining gases or vapors will usually contain as a major component, hydrogen chloride. This hydrogen chloride may be disposed of or utilized for other purposes on the plant site, however it is usually desirable to recycle at least a portion of these materials back to the hydrochlorinator.

In order that those skilled in the art may better understand the process of this invention the following example is given.

EXAMPLE

In the following example, the process equipment, piping, reactors, condensers and the like was arranged in a manner similar to that depicted in the schematic drawing except as otherwise indicated.

Gaseous chlorine at a temperature of 80°F and 60 psig was premixed with the overhead from the product column (thermal chlorinator feed) and the mixture so formed fed into a reaction vessel or thermal chlorinator. The thermal chlorinator had been precharged with Ottawa sand which was, during normal operations, suspended in the fluidized state. The thermal chlorinator feed (or overhead from the products column) was preheated to a temperature of 400°F in a furnace prior to mixing with the chlorine feed. The temperature in the fluidized chlorination zone was stabilized at 700°F and the pressure was 50 psig. During lengthy continuous operations it was unnecessary to supply heat to or remove heat from the thermal chlorinator, in other words the chlorination step was substantially adiabatic.

The reaction system was withdrawn from the thermal chlorinator at about 675°F and charged into a quench drum where the temperature of the material was rapidly reduced to about 225°F. From time to time liquid formed in the quench drum, i.e., high boilers such as 1,1,2-trichloroethane are removed therefrom to prevent the accumulation of liquid which would interfere with the operation of the drum. The stream thus partially cooled was passed from the quench drum into a water cooled condenser wherein the stream was partially condensed. The partially condensed stream from the condenser was passed into a knock-out vessel wherein the non-condensed material, primarily hydrogen chloride, was withdrawn from the knock-out drum and recycled into the hydrochlorinator. The hydrogen chloride recycled from the thermal chlorinator knockout drum provided a major portion of the hydrogen chloride feed requirements for the hydrochlorinator. The liquid portion of the partially condensed stream was passed from the thermal chlorinator knock-out drum recycled to the upper portion of the light ends column. A portion of the liquid in the thermal chlorinator knock-out drum provided the quench liquid for the quench drum.

Vinyl chloride at a temperature of 80°F and pressure of 46 psig was premixed with a hydrogen chloride stream and fed into a hydrochlorination reaction vessel. During normal operations substantially all of the hydrogen chloride requirements were provided by the hydrogen chloride generated within the system itself. Makeup catalyst waa added to the hydrochlorinator in small quantities. The temperature in the hydrochlorinator reaction zone was 142°F and the pressure was 15 psig. The hydrochlorinator product vapors were withdrawn from the top of the hydrochlorinator passed through a drum or vessel which entrapped polymeric materials and passed into a condensation zone which was composed of two condensers. Volatile material such as hydrogen chloride and minor amounts of other materials contained within the thus condensed stream, were removed as a vapor, compressed and recycled to the hydrochlorinator. The material condensed in the condensation zone was fed into a light ends column. The light ends column was a tray distillation type column fitted with an overhead condenser and a steam reboiler. The condensed material from the hydrochlorinator was fed into the column near the bottom.

The stream of condensate from the thermal chlorinator condenser was also passed into the light ends column near the bottom. The light ends column overhead vapors were recycled to the hydrochlorinator and the bottoms from the light ends column was fed to the heavy ends column. The heavy ends column was a tray distillation type column fitted with an overhead condenser and a steam reboiler. The feed from the light ends column was introduced near the center. During operation conditions the temperature of the bottoms was 250°F and the tops 160°F. The pressure at the top was 5 psig. The bottoms from the heavy ends column was withdrawn and sent to disposal. The tops from the heavy ends column were condensed and fed into the product column. The product column was a tray distillation type column operating at a bottoms temperature of 200°F and a top temperature of 150°F. The column was fitted with a steam reboiler and an overhead condenser. The material from the top of the product column was condensed, preheated and fed to the thermal chlorinator as feed. Substantially pure methyl chloroform was withdrawn as the product from the first tray of the product column, condensed and sent to storage.

82.0 Percent of the vinyl chloride fed into the hydrochlorinator zone was converted into 1,1,1-trichloroethane (based on moles of vinyl chloride fed and moles of 1,1,1-trichloroethane recovered).

Analysis of the product demonstrated that it contained 99.30 mole percent 1,1,1-trichloroethane, 0.31 mole percent 1,1-dichloroethane, 0.35 mole percent trichloroethylene, and 0.04 percent cis-1,2-dichloroethane.

Similar results are obtained when the chlorination is conducted under other conditions, as for instance with a fixed bed of sand, or with a chlorination catalyst. Also the hydrochlorination can be carried out with different reaction proportions. All such variations vary the yields and throughputs of the chlorination and/or the hydrochlorination, but still provide a combined output for distillation to obtain high quality 1,1,1-trichloroethane.

Such distillation can also be carried out in a single tower having four outputs corresponding to those described above and shown in the Drawing, such distillation systems being known to the art. Other numbers of distillation towers or columns can also be used.

What we claim as new and desired to secure by Letters Patent of the United States is as follows:

1. A process for the production of substantially pure 1,1,1-trichloroethane comprising, in combination, the production of a chlorination product liquid stream and the production of a liquid portion of a hydrochlorination product stream and then the coincident processing of the two produced streams to obtain a feed system for the production of said chlorination product liquid stream and said substantially pure 1,1,1-trichloroethane product; the production of said chlorination product liquid stream comprising in combination, the steps of:

a. introducing chlorine and a preheated 1,1-dichloroethane feed stream preheated to a temperature of from about 100°F to about 500°F into a chlorination zone having a fluidized bed contacting medium and having an operating temperature of from about 600°F to about 800°F and an operating pressure up to about 200 psig to produce a chlorination product stream comprising 1,1,1-trichloroethane, 1,1-dichloroethane, hydrogen chloride and associated by-products; and b. quenching said chlorination product stream to form a gaseous part and a liquid part which liquid part contains at least a portion of said associated by-products, separating said gaseous part and said liquid part, passing said gaseous part to a condensation zone wherein partial condensation of said gaseous part occurs to produce a partially condensed stream, and passing said partially condensed stream to a separation zone in which a portion of said hydrogen chloride is removed from said partially condensed stream as a gas, said remaining partially condensed stream being said chlorination product liquid stream;

the production of said liquid portion of said hydrochlorination product stream comprising, in combination, the steps of:

c. introducing vinyl chloride and a molar excess of hydrogen chloride into a hydrochlorination zone having an operating temperature of from about 100°F to about 200°F and a superatmospheric operating pressure to produce a hydroclorination product stream comprising 1,1-dichloroethane, vinyl chloride, hydrogen chloride and associated by-products; and d. producing said liquid portion of said hydrochlorination product stream by partially condensing the hydrochlorination product stream and removing therefrom hydrogen chloride as a gas;

and the coincident process of said two produced liquid streams comprising, in combination, the steps of:

e. providing a light ends distillation zone having an upper portion and a lower portion;

f. introducing said chlorination product liquid stream to said upper portion and introducing said liquid portion of said hydrochlorination product stream to said lower portion to produce a light ends overhead stream comprising hydrogen chloride and a light ends bottom stream comprising 1,1-dichloroethane, 1,1,1-trichloroethane and 1,1,2-trichloroethane;

g. introducing said light ends bottom stream to a heavy ends distillation zone to produce a heavy ends overhead stream comprising 1,1-dichloroethane and 1,1,1-trichloroethane and a heavy ends stream comprising 1,1,2-trichloroethane;

h. introducing said heavy ends overhead stream to a product distillation zone to produce a product overhead stream comprising 1,1-dichloroethane and a product bottom stream comprising 1,1,1-trichloroethane;

i. heating said product overhead stream for use as substantially all of said preheated 1,1-dichloroethane feed stream for said chlorination zone; and j. recovering said product bottom stream as said substantially pure 1,1,1-trichloroethane product.

2. The process of claim 1 further characterized by the use of the hydrogen chloride separated from said chlorination product stream as at least a part of said molar excess of hydrogen chloride introduced into said hydrochlorination zone.

3. The process of claim 1 further characterized by the use of the hydrogen chloride removed from said hydrochlorination product stream as at least a part of said molar excess of hydrogen chloride introduced into said hydrochlorination zone.

4. The process of claim 1 wherein hydrogen chloride in said light ends overhead stream is recycled to said hydrochlorination zone as a part of the hydrogen chloride feed thereto.

5. The process of claim 1 wherein the 1,1-dichloroethane feed to said chlorination zone is preheated to a temperature within the range of from about 300°F to about 450°F.

6. The process of claim 4 further characterized by using the combination of hydrogen chloride from said chlorination product stream, from said hydrochlorination product stream and from the light ends overhead stream to supply substantially all of said molar excess of hydrogen chloride introduced into said hydrochlorination zone.

7. The process of claim 1 wherein said operating temperature in said chlorination zone is within the range of from about 650°F to about 750°F and wherein said operating pressure in said chlorination zone is from about 40 to about 60 pounds per square inch gauge.

8. The process of claim 1 wherein the molar ratio of chlorine to 1,1-dichloroethane introduced into the chlorination zone is maintained within from about 0.2 to 1 to about 0.7 to 1.

9. The process of claim 8 wherein said molar ratio is within from about 0.3 to 1 to about 0.35 to 1.

10. The process of claim 1 wherein the reaction within the hydrochlorination zone is a catalytic reaction and the catalyst is a Friedel-crafts catalyst.

11. The process of claim 10 wherein said catalyst is iron chloride.

12. The process of claim 10 wherein said catalyst is aluminum chloride.

13. The process of claim 1 wherein said hydrochlorination zone operating temperature is from about 135°F to about 150°F and said hydrochlorination zone operating pressure is from about 5 psig to about 20 psig.

* * * * *

UNITED STATES PATENT OFFICE
CERTIFICATE OF CORRECTION

PATENT NO. : 3,903,183
DATED : September 2, 1975
INVENTOR(S) : Andrew O. Wikman, et al It is certified that error appears in the above-identified patent and that said Letters Patent are hereby corrected as shown below:

Col. 7, line 7, reads "waa" should read --was--;
Col. 8, line 10 reads "system" should read --stream--.

Signed and Sealed this eighth Day of June 1976

[SEAL]

Attest:

RUTH C. MASON
*Attesting Officer*

C. MARSHALL DANN
*Commissioner of Patents and Trademarks*